Patented June 24, 1924.

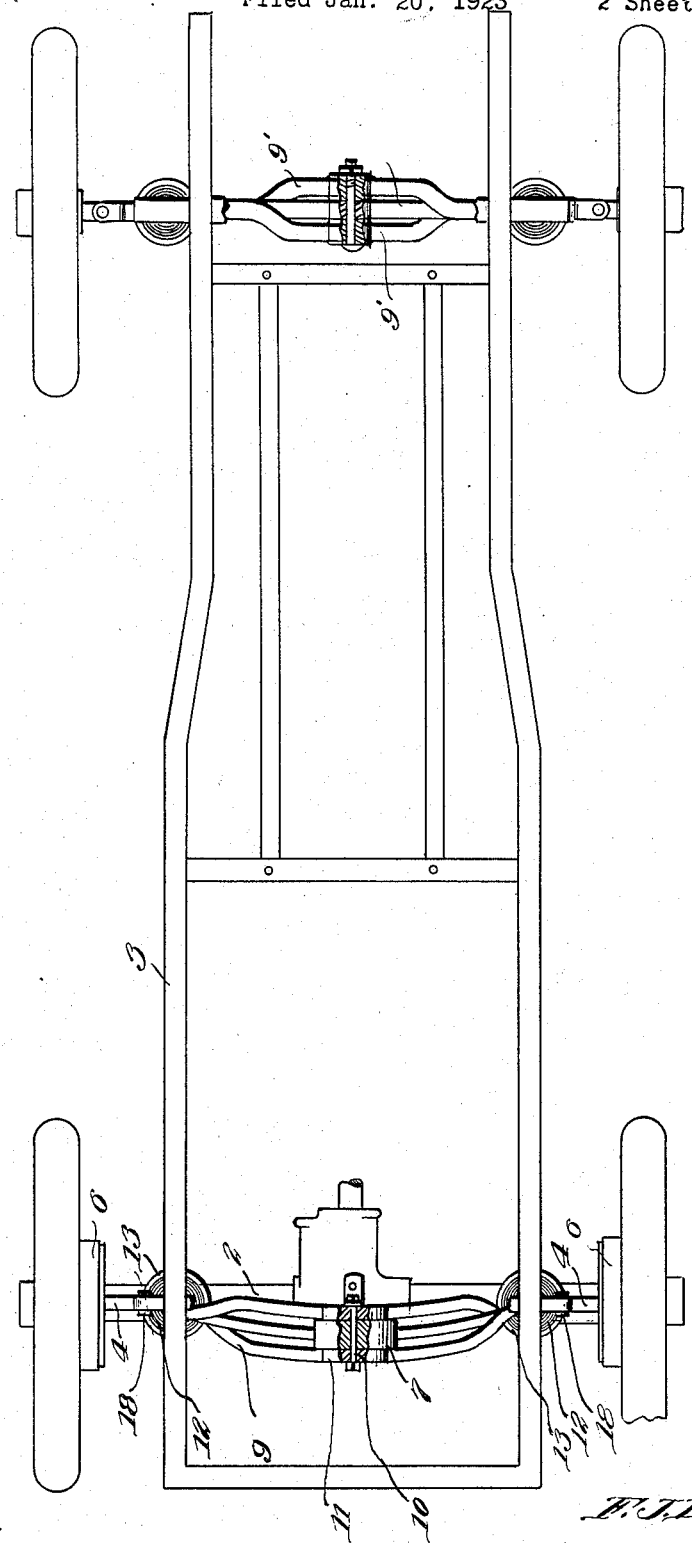

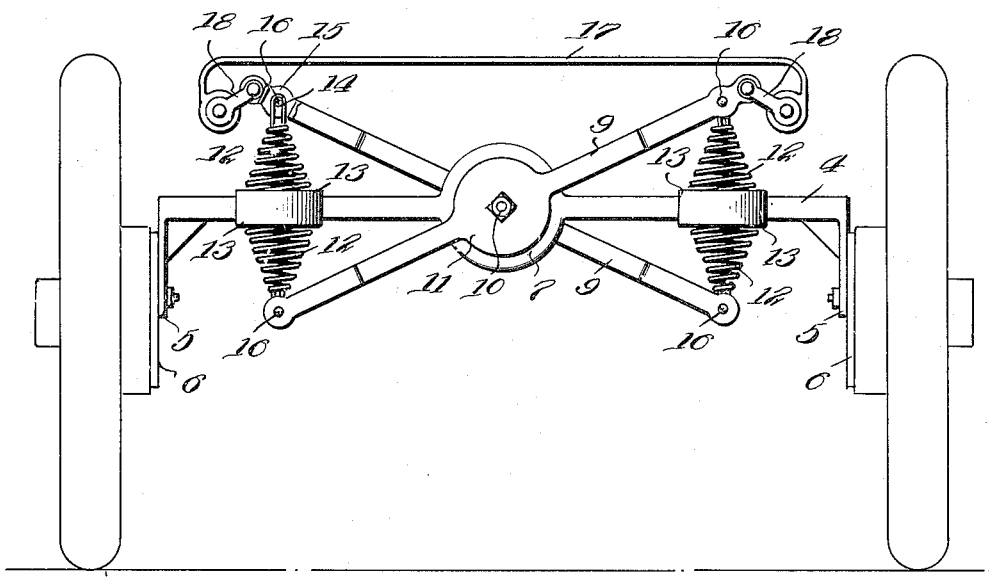
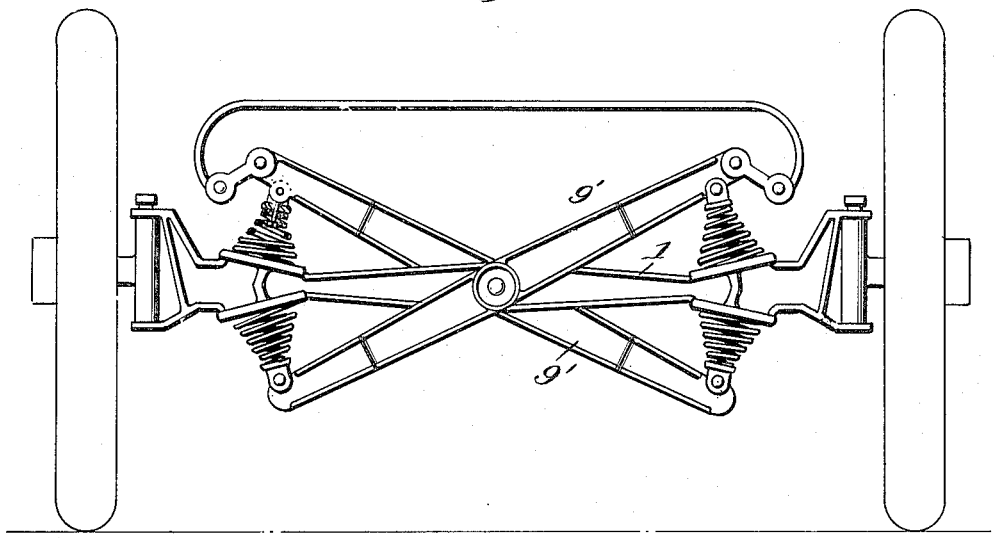

1,498,956

UNITED STATES PATENT OFFICE.

FREDERICK J. DUHRSEN, OF HAKALAU, TERRITORY OF HAWAII.

SHOCK ABSORBER.

Application filed January 20, 1923. Serial No. 613,978.

*To all whom it may concern:*

Be it known that I, FREDERICK J. DUHRSEN, a citizen of the United States, residing at Hakalau, Territory of Hawaii, have invented new and useful Improvements in Shock Absorbers, of which the following is a specification.

The object of this invention is to provide resilient means for supporting the body of a vehicle upon its running gear, the present invention being designed to take the place of the usual springs.

Another object of the invention is to so construct the parts that both the upward and downward movements of the body will be checked, thus insuring easy riding of the vehicle.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a plan view of the running gear of a vehicle showing my invention in use.

The remaining figures are detail views.

In these views 1 indicates the front axle of a vehicle, 2 the rear axle thereof and 3 the body. In carrying out my invention I place a curved bar 4 adjacent the rear axle with its depending ends 5 connected with the brake drums 6 of the vehicle. The bar is formed with a circular enlargement 7 at its center which extends beyond the faces of the bar and this enlargement is provided with a centrally located hole 8. A pair of levers 9 are pivotally secured to the bar by the pin 10 which passes through the hole 8 and the centrally arranged holes in the levers. Each lever is provided with a central enlargement 11 which engages the enlargement 7 of the bar. One of the levers is placed at one side of the bar and the other lever at the opposite side. A conical shaped coil spring 12 is provided for each end of each lever, the large ends of these springs being secured to seats 13 formed on the bar 4 and having their small ends secured to the levers by means of the eyes 14 on the springs engaging slots 15 in the levers, bolts 16 holding the eyes in the slots. The springs are arranged in pairs upon the bar 4, one spring of each pair resting upon the upper seat on the bar and the other spring upon the lower seat of the bar. The sill 17 of the body is connected with the upper end of each lever by the shackle 18, the ends of the sill being curved, as shown.

The arrangement of parts at the front of the vehicle is similar to that just described with the exception of the levers 9′ which are pivoted to the front axle, as shown.

This arrangement of parts will be stronger than the leaf springs now in use and provides a much easier riding vehicle as it is just as strong on the recoil as on the downward thrust.

The rear spring assembly can be incorporated with the axle housing by being bolted to the rear of the gear bar and having supports above and below the axle housing somwhat similar to that shown for the front axle.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. In a vehicle, front and rear supports, a pair of levers pivotally connected with each support intermediate their ends, coil springs arranged in pairs upon each support, one spring of each pair extending downwardly and engaging the lower end of one lever and the other spring of each pair extending upwardly and engaging the upper end of the opposite lever and means for connecting the upper ends of the levers to the body.

2. In a vehicle, front and rear supports, a pair of levers pivotally connected with each support intermediate their ends, coil springs arranged in pairs upon each support, one spring of each pair extending downwardly and engaging the lower end of one lever and the other spring of each pair extending upwardly and engaging the upper end of the opposite lever, means for connecting the upper ends of the levers to the body, such means consisting of parts on the body having curved ends and shackles connecting the curved ends with the levers.

3. In a vehicle, a cross piece connected with the running gear thereof at the rear, a pair of levers pivotally connected with said cross piece intermediate their ends, coil springs arranged in pairs upon the cross piece, one spring of each pair extending upwardly and engaging the upper end of one lever and the other spring extending downwardly and engaging the lower end of the other lever and means for connecting the upper ends of the levers to the body of the vehicle.

In testimony whereof I affix my signature.

FREDERICK J. DUHRSEN.